2,871,165
Patented Jan. 27, 1959

2,871,165

PROCESS FOR PREPARING PANKRIN

Kenneth C. Robbins and Norman H. Grant, Chicago, Ill., assignors to Armour and Company, Chicago, Ill., a corporation of Illinois No Drawing. Application April 11, 1955
Serial No. 500,652

12 Claims. (Cl. 195—63)

This invention relates to a novel proteolytic enzyme substance, and more particularly to a pancreatic proteinase which is especially useful in dispersing tissue cells in tissue cultures.

The preparation of tissue culture media for growing microorganisms such as tissue degenerative viruses, involves the dispersion of tissue cells within the culture medium to facilitate the availability thereof to the microorganism. Hitherto, this dispersion of tissue cells within the tissue medium has been obtained with crude pancreatic products. These products contain a variety of enzymic agents, including proteinases, lipases, amylases and nucleases. Consequently, the application of crude pancreas material to tissue cultures results in hydrolysis and decomposition of numerous constituents thereof, in addition to the dispersion of tissue cells. This produces an undesirable breakdown of certain essential elements of the tissue culture, and renders most difficult the obtaining of uniform tissue cultures from batch to batch. Therefore, the growth of microorganisms in the tissue cultures cannot be controlled to the desired degree.

We have discovered a proteolytic enzyme substance capable of dispersing tisue cells in microorganism cultures without producing undesirable degradation and decomposition in the tissue culture. This enzyme, which we have designated "pankrin," can be characterized analytically by its ability to clot milk in the method of Kunitz, reported in J. Gen. Physiol., 18, 495 (1935), wherein milk clotting action is expressed in rennet units per mg. of enzyme and by its inability to clot citrated plasma on any basis of comparison with trypsin, i. e. weight, proteolytic unitage or TSAME esterase unitage. Also, pankrin may be characterized by its sensitivity to general protease inhibitors, e. g. diisopropylfluorophosphate (DFP) and blood serum, and specific trypsin inhibitors derived from pancreas, soybean, etc. That is, whereas pankrin is substantially inhibited by DFP and blood serum, it is incompletely inhibited by soybean and pancreas trypsin inhibitors. Further, pankrin sensitivity to d-phenylalanine (carboxypeptidase inhibitor) and to beta phenyl propionate (chymotrypsin and carboxypeptidase inhibitor) differs qualitatively from that of either chymotrypsin or carboxypeptidase. Another characteristic of pankrin is that its proteolytic action proceeds substantially undiminished in the absence of such reducing agents as cysteine and hydrogen sulfide.

This proteinase may be characterized chemically by being soluble in a 60% (by volume) aqueous alcohol solution at a temperature of 25° C. Also, the proteolytic activity of pankrin can be maintained in aqueous solution for a period of 8 hours at a temperature of 25° C. and a pH of 4.7 and for two months at a temperature of 2 to 3° C. and a pH of either 7.4 or 4.7.

The enzymatic activity of pankrin may be characterized by the ratio of its proteolytic activity on urea-denatured hemoglobin substrate to its esterase activity on acetyl-1-tyrosine ethyl ester (ATEE) substrate being at least 150. For example, we have found that a partially purified preparation of this proteinase demonstrates an activity of 38.4 units on urea-denatured hemoglobin substrate, while its activity on ATEE substrate is 0.187 unit. Thus, the ratio of hemoglobin activity to ATEE activity for this preparation is 206. On the other hand, a crystallized chymotrypsin product demonstrates an activity of 5.7 units on urea-denatured hemoglobin substrate and 0.396 unit on ATEE substrate, and consequently the hemoglobin: ATEE ratio for chymotrypsin is 14.4.

This ATEE substrate has been found to be specific for chymotrypsin by Kaufman, S., J. Biol. Chem. 177, 793 (1949), while p-toluenesulfonyl-1-arginine methyl ester substrate (TSAME) has been reported as specific for trypsin by Schwert, G. W., J. Biol. Chem., 172, 221 (1948). A unit of esterase activity for either of these specific substrates can be defined as the hydrolysing of 1 mm. of substrate per minute per mg. of enzyme.

The proteolytic activity of these enzyme preparations on urea-denatured hemoglobin can be measured according to the procedure published by Anson, J. Gen. Physiol. 22, 79 (1938), wherein 1 unit of proteolytic activity can be defined as the liberation of 1 mg. of tyrosine per mg. of enzyme in 10 minutes at a temperature of 37° C. We have found that the optimal rate of pankrin proteolysis of denatured hemoglobin can be obtained at a pH within the range of 7 to 9. This analytical procedure may be applied to native protein substrates as well as to those which have been denatured with urea, etc. Also, this procedure may be used in connection with such other protein substrates as casein and blood albumin.

The esterase activity of crystallized trypsin on TSAME substrate has been found to be 0.448, while that of a partially purified pankrin preparation is 0.138. We have found that the ratio of the activity of pankrin on the hemoglobin substrate to ATEE substrate remained practically constant through partial purification of such enzyme. For example, the hemoglobin: ATEE ratio for 6 pankrin preparations having different degrees of purity was 192±34. Thus, the ATEE activity may be inherent in the pankrin molecule. However, it is conceivable that the ATEE activity may be merely a contaminant chymotrypsin substance closely associated with pankrin. Consequently, by "ratio of pankrin activity on urea-denatured hemoglobin substrate to ATEE substrate," we intend to include the possibility that the denominator ATEE substrate activity may be 0, whereby the urea-denatured hemoglobin activity of the pankrin can still be regarded as more than 150 units and of a ratio of at least 150.

This proteinase, which is an endopeptidase, has been found to be insoluble in water.

This proteinase can be obtained by a method which involves contacting a weak cation exchange material and a crude aqueous concentrate of the pancreas, containing this proteinase, to adsorb the enzyme onto the cation exchange material. The adsorbed proteinase can be eluted from the cation exchange material with an aqueous saline solution.

This crude aqueous concentrate of pancreas may be prepared by contacting a subdivided pancreas tissue with an aqueous solution to obtain an aqueous extract containing this proteolytic enzyme substance. The pancreas glands may be subdivided by such procedures as hashing, grinding and comminuting, and then defatted by solvent extraction employing such solvents as acetone, xylene and petroleum hydrocarbon fractions. Although mammalian pancreas tissue, such as hog and beef pancreas, is the preferred source of this proteolytic enzyme, it will be understood that the enzyme may be obtained from other sources thereof. This pancreas tissue may contain comminuted porcine duodenal tissue, e. g., about 10% by weight. We have not completely characterized the activation mechanism for pankrin. However, if this proteinase is contained homostatically in the pancreas as a proenzyme, i. e. as the inactive precursor, it may be activated in the duodenum by a method similar to the activation of trypsinogen by enterokinase or the activation of chymotrypsinogen by trypsin. Consequently, it may be desirable to include duodenal material in this pancreas extraction slurry. Also, the extraction slurry may contain an inorganic salt, such as sodium chloride. The extraction of the enzyme can be completed in about 2 to 3 hours at a temperature of 25° C., and in about 10 to 16 hours at a temperature of 0° C. This enzyme extract can be separated from the tissue residue by such methods as centrifugation and filtration, and the separated residue may be discarded or employed in producing other pancreatic factors.

Any crude aqueous concentrate of this proteinase, such as the aforementioned pancreatic extract, can be subjected to this adsorption-elution procedure to obtain a purified pankrin product. In this purification procedure, the adsorption of the proteinase may be obtained on weak cation exchange materials, such as carboxylic acid resins, e. g. XE-97 and IRC-50 (manufactured by Rohm and Haas). Although we have found that this proteinase can be adsorbed onto the exchange material at a pH within the range of 4.5 to 5.0 and at an ionic strength of less than about 0.4, especially desirable adsorption of the enzyme results at a pH of 4.7 and an ionic strength of 0.05. The temperature for obtaining adsorption of this proteinase may be about 25° C.

The cation exchange material may be equilibrated to these adsorption conditions by, for example, contacting the resin with a pH 4.7, 0.05 M sodium acetate-acetic acid buffer solution. The equilibration of the resin can be obtained by suspending the resin and the buffer solution. After the resin has attained an equilibrium condition with the buffer, the bulk of the solution can be separated from the resin by, for example, decantation. The crude aqueous concentrate, containing this proteinase, can be adjusted to the adsorption conditions by, for example, dilution with water to an ionic strength of less than 0.4, when the ionic strength of the aqueous enzyme concentrate is greater than 0.4. On the other hand, the aqueous proteinase concentrate can be mixed with the equilibrated resin and a volume of water such as to reduce the ionic strength of the resulting mixture to less than 0.4 to obtain the adsorption conditions.

This adsorption step may be carried out by mixing the equilibrated cation exchange material and the aqueous enzyme concentrate in a batch type procedure, and thereafter separating the exchange material from the supernatant liquid by such methods as centrifugation and filtration. Alternatively, the resin may be packed into a cylindrical column, and the aqueous enzyme concentrate passed through such column at a rate of flow such as to adsorb the proteinase onto the exchange material.

The proteinase can be eluted from the cation exchange material at a pH of from 4.5 to 5.0 and at an ionic strength of more than about 0.4. Better elution results can be obtained at a pH of about 4.7 and at an ionic strength between 0.8 and 1.5, and especially desirable elution results are achieved at an ionic strength of about 1.2. This elution step may be carried out by contacting the cation exchange material, having the proteinase adsorbed thereon, and an aqueous saline solution having an ionic strength of at least about 1.0. Better results are obtained when the ionic strength of this aqueous eluant is about 2.0. The contact between exchange material and eluant to obtain elution of the enzyme may be achieved by such procedures as the aforementioned batch-type and columnar systems. The ionic strength condition employed in this purification procedure can be obtained with any inorganic salt which is inert with respect to the proteinase.

The eluted proteinase may be further purified by repeating the aforementioned adsorption-elution procedure. Also, this proteinase may be purified by fractionating the previously described eluate at substantially complete saturation with ammonium sulfate. We have found that the eluted proteinase is substantially soluble at an ammonium sulfate saturation of less than 0.8, but that it is insolubilized at an ammonium sulfate saturation of more than about 0.8. In the alternative, the eluted enzyme may be fractionated at an alcohol concentration of at least about 65% at a temperature of −5° C. Although we have found that this proteinase enzyme is substantially insoluble at an alcohol concentration of about 65%, more complete precipitation thereof is obtained at an alcohol concentration of about 80% and a temperature of −5° C. As alcohols suitable for fractionating this proteinase we mention, for example, ethanol and methanol.

The precipitated enzyme substance may be separated from the supernatant liquid by such methods as centrifugation and filtration, and after dialysing to remove residual salt or solvent therefrom, if desired, the enzyme substance may be dehydrated. Preferably, this dehydration of the enzyme substance is obtained by lyophilization.

The dispersion of tissue cells in a tissue culture can be obtained by contacting a suspension of subdivided animal tissue and a preparation of this proteinase substance. For example, subdivided monkey kidney tissue, suspended in a suitable microorganism growth medium, can be mixed with a 1% solution of this enzyme substance to produce disintegration of the tissue fragments into single cells. The tissue cell dispersed growth culture thereby obtained can be employed in culturing microorganisms, such as tissue-degenerative viruses. The nutrients included in the growth culture vary with the requirements of particular organisms, and a suitable medium for culturing tissue-degenerative viruses, such as poliomyelitis, is described by J. S. Youngner in Proc. Exp. Biol. & Med., 85, 202 (1954).

This invention can be further illustrated by the following examples:

*Example 1*

Porcine pancreas tissue, having been subdivided by hashing, defatted by solvent extraction and dehydrated, in the amount of 400 grams, was mixed with 2000 ml. of water. The dry pancreas tissue contained about 8% by weight of sodium chloride and 10% by weight of porcine duodenal tissue. This mixture was extracted by agitation at a temperature of 25° C. for a period of five hours. The extract thereupon formed was separated from the tissue residue by centrifugation, and the volume of extract obtained was 1800 ml.

A carboxylic acid type resin (XE-97), in the amount of 180 grams, was equilibrated with a 0.05 M acetate buffer, containing sodium acetate and acetic acid, at a pH of 4.7. The equilibrated resin was mixed with 720 ml. of the pancreatic extract and 4950 ml. of water. The resulting mixture was stirred at a temperature of 25° C. for a period of 90 minutes, and thereafter the resin was separated from the supernatant liquid by centrifugation. The separated resin was washed with water two times, each wash being obtained with 1800 ml. of water. The wash waters were separated from the resin by centrifugation and discarded. The washed resin was mixed with 760 ml. of pH 4.7, 2 M sodium acetate-acetic acid buffer solution, and the resulting mixture was agitated for a period of 90 minutes at a temperature of 25° C. The eluate was separated from the resin by centrifugation, and thereupon 690 ml. of eluate was recovered having a protein concentration of 2.4 mgms. per ml. as determined by the Folin micro protein method. This eluate, in the amount of 675 ml., was mixed with 393 grams of solid ammonium sulphate, and agitated at a temperature of 25° C. for a period of one hour to obtain dissolution of the ammonium sulphate. The precipitate thereupon formed was separated from the supernatant liquid by filtration, and the separated precipitate dried by lyophilization. The lyophilized product weighed 11.3 grams, and contained about 5% of protein. The proteinase activity of this dried product was determined employing hemoglobin as a substrate, and the result can be expressed as either 0.11 mg. of tyrosine liberated per mg. of weight or 2.2 mg. of tyrosine liberated per mg. of protein.

*Example II*

A dried, defatted and comminuted porcine pancreas product, containing about 8% by weight of sodium chloride amd 10% by weight of porcine duodenal tissue, in the amount of 800 grams, was mixed with 4000 ml. of water. This mixture was agitated for a period of 3 hours at a temperature of 25° C. The extract thereupon formed was separated from the tissue residue by centrifugation, and the volume of extract thereby obtained was 3700 ml.

A carboxylic acid type resin (XE-97), in the amount of 200 grams, was equilibrated with a pH 4.7, 0.05 M sodium acetate-acetic acid buffer solution. The equilibrated resin was mixed with 800 ml. of the pancreatic extract and 5450 ml. of water. This mixture was agitated for a period of 135 minutes at a temperature of 25° C. The resin was separated from the supernatant liquid by centrifugation, and the supernatant liquid was discarded. Then, the resin was washed two times, each wash being obtained with 2000 ml. of water. The washes were separated from the resin by centrifugation and discarded. The washed resin was eluted with 800 ml. of pH 4.7, 2 M sodium acetate-acetic acid buffer solution by agitation at a temperature of 25° C. for a period of 135 minutes. The resulting eluate was separated from the resin by centrifugation, and the resin was discarded. The eluate was obtained in a volume of 750 ml., containing 3.1 mg. of protein per ml.

A portion of this eluate, in the amount of 720 ml. was mixed with 341 grams of solid ammonium sulphate, and the resulting mixture was agitated at a temperature of 25° C. for a period of one hour. The precipitate thereupon formed was settled at a temperature of 0° C., and separated from the supernatant liquid by centrifugation. The precipitate was dried by lyophilization and the dried product was obtained in a yield of 10.98 grams. This dried product had a proteinase activity equal to 0.4 mg. tyrosine per mg. of product or 8.0 mg. of tyrosine per mg. of protein (the dried product contained about 5% protein).

A second portion of the eluate, in the amount of 700 ml. was mixed with 332 grams of solid ammonium sulphate, and the mixture was agitated at a temperature of 25° C. for a period of one hour. The precipitate thereupon formed was settled at a temperature of 0° C., and separated from the supernatant liquid by centrifugation. This precipitate was dehydrated by lyophilization, and the dried product was obtained in a yield of 14.35 grams containing about 5% by weight of protein. The proteinase activity of this product was equivalent to 0.37 mg. of tyrosine per mg. of product, or 7.4 mg. of tyrosine per mg. of protein.

*Example III*

Comminuted, defatted and dried porcine pancreas tissue, containing about 8% by weight of sodium chloride, and 10% by weight of porcine duodenal tissue, in the amount of 400 grams, was mixed with 2000 ml. of water. This mixture was agitated for a period of 4 hours at a temperature of 25° C. The extract thereupon formed was separated from the tissue residue by centrifugation. This pancreatic extract was obtained in a volume of 1530 ml.

A carboxylic acid type resin (XE-97), in the amount of 300 grams, was equilibrated with pH 4.7, 0.05 M sodium acetate-acetic acid buffer solution. The equilibrated resin was mixed with 1200 ml. of the pancreatic extract and 8174 ml. of water, and the resulting mixture was stirred at a temperature of 25° C. Then, the resin was separated from the supernatant liquid, and such supernatant liquid discarded. The resin was washed two times, each wash being obtained with 3000 ml. of water. These washes were separated from the resin by centrifugation, and discarded. The resin was mixed with 1200 ml. of pH 4.7, 2 M sodium acetate-acetic acid buffer solution, and the resulting mixture was agitated at a temperature of 25° C. The eluate thereupon formed was separated from the resin by centrifugation. This eluate was mixed with 498 grams of solid ammonium sulphate, and the resultant mixture was agitated for a period of one hour at a temperature of 25° C. Thereafter, the mixture was settled at a temperature of 0° C., and the precipitate thereupon formed was separated by centrifugation. This precipitate was dried by lyophilization, and the resulting dried product weighed 23.0 grams containing about 5% of protein. The proteinase activity of this product was determined as 0.25 mg. of tyrosine per mg. of product, or 5.0 mg. of tyrosine per mg. of protein.

The aforementioned eluted resin was mixed with 500 ml. of pH 4.7, 2 M sodium acetate-acetic acid buffer solution. The resulting mixture was agitated at a temperature of 0° C., and thereafter the elute was separated from the resin by centrifugation. This eluate, which was obtained in a volume of 450 ml. was mixed with 214 grams of solid ammonium sulphate. The resulting mixture was agitated at a temperature of 25° C. for a period of one hour, and the precipitate thereupon formed was settled at a temperature of 0° C. This precipitate was separated from the supernatant liquid by centrifugation, and such precipitate was dehydrated by lyophilization. The yield of dried product was 6.6 grams, containing about 5% by weight of protein. The proteinase activity of this product was determined as 0.36 mg. of tyrosine per mg. of product or 7.2 mg. of tyrosine per mg. of protein.

*Example IV*

Dried, defatted and comminuted porcine pancreas tissue, containing about 8% by weight of sodium chloride, and 10% by weight of porcine duodenal tissue, was mixed with 3600 ml. of water. This mixture was agitated at a temperature of 25° C. for a period of 5 hours. The resulting extract was separated from the tissue residue by centrifugation, and the volume of extract thereby obtained was 3050 ml.

A carboxylic acid type resin (XE-97), in the amount of 700 grams, was equilibrated with pH 4.7, 0.05 M sodium acetate-acetic acid buffer solution. The equilibrated resin was mixed with 2800 ml. of the pancreatic extract and 19090 ml. of water. This mixture was agitated for a period of 60 minutes at a temperature of 25° C. Then, the resin was separated from the supernatant liquid by centrifugation. This resin was washed two times, each wash being obtained with 7000 ml. of water. These washes were separated from the resin by centrifugation, and discarded. The washed resin was mixed with 3000 ml. of pH 4.7, 2 M ammonium acetate-acetic acid buffer solution, and the resulting mixture was agitated for a period of 60 minutes at a temperature of 25° C. The eluate thereupon formed was separated from the resin by centrifugation. This eluate was obtained in a volume of 2800 ml. containing 3.0 mg. of protein per ml. as determined by the Folin micro protein method.

A portion of this eluate, in the amount of 380 ml., was mixed with 2045 ml. of 95% 3A alcohol. The alcohol was added to the eluate capillary-wise at a temperature of −5° C. with vigorous agitation. The precipitate thereupon formed was settled at a temperature of −5° C., and such precipitate was separated from the supernatant liquid by centrifugation. The separated precipitate was dried by lyophilization, and obtained in a yield of 0.49 gram. This product which was substantially all protein was designated by the numeral A.

A second portion of this eluate, in the amount of 1600 ml., was mixed with 8600 ml. of 95% 3A alcohol. The alcohol was added to the eluate capillary-wise at a temperature of −5° C. with vigorous agitation. The precipitate thereupon formed was settled at a temperature of −5° C., and then separated from the supernatant liquid by centrifugation. This precipitate was dehydrated by lyophilization, and obtained in a yield of 2.6 grams. This dried product which was substantially all protein was designated by the numeral B.

A third portion of the eluate, in the amount of 595 ml., was mixed with 3200 ml. of 95% 3A alcohol. The alcohol was added to the eluate capillary-wise at a temperature of −5° C. with vigorous agitation. The precipitate thus formed was settled at a temperature of −5° C., and separated from the supernatant liquid by centrifugation. This separated precipitate was dehydrated by lyophilization, and the dried product weighed 0.70 gram. This dry product was designated by the numeral C, and was substantially all protein.

The aforementioned dried products, A and B and C, were pooled together and mixed to form a uniform pool. This pool was analyzed for proteinase activity, and the results indicated an activity of 6.5 mg. of tyrosine per mg. of product.

*Example V*

A proteinase eluate obtained according to the method of Example IV was subjected to a similar adsorption procedure, as follows:

This eluate, in a volume of 140 ml., was mixed with 965 ml. of water and 96.5 ml. of packed XE-97 resin, containing 35 g. of dry resin previously equilibrated according to the method of Example IV.

The resulting mixture was agitated at room temperature for a period of 30 minutes. Then, the supernatant liquid was separated from the resin by centrifugation, and discarded. The separate resin was eluted with 168 ml. of pH 4.7, 2 N ammonium acetate-acetic acid buffer solution.

This eluate was analysed, and the results were as follows:

Protein concentration (Micro Folin method, mg./ml.) _____ 0.246
Proteolytic activity (denatured hemoglobin substrate, units/ml _____ 9.44

Thus, the purity of this pankrin product can be calculated as 38.4 proteolytic units per mg. of protein.

*Example VI*

The proteolytic activity of the pankrin product obtained in Example V was compared with that of trypsin and chymotrypsin on different protein substrates, wherein D refers to the urea-denatured form of the substrate and N designates the native substrates.

The results were as follows:

| Substrate | Trypsin | Chymo-Trypsin | Pankrin | Pankrin: Trypsin [1] | Pankrin: Chymo-Trypsin [2] |
|---|---|---|---|---|---|
| D Hemoglobin | 11.94 | 5.70 | 38.40 | 3.2 | 6.7 |
| N Hemoglobin | 1.79 | 1.10 | 5.36 | 3.0 | 4.9 |
| D Serum Albumin | 4.77 | 2.45 | 6.17 | 1.3 | 2.5 |
| N Serum Albumin | 0.44 | 0.38 | 1.90 | 4.3 | 5.0 |
| D Casein | 11.52 | 18.40 | 31.55 | 2.7 | 1.7 |
| N Casein | 6.16 | 9.49 | 9.54 | 1.5 | 1.0 |

[1] Ratio of activity of pankrin to trypsin.
[2] Ratio of activity of pankrin to chymotrypsin.

*Example VII*

The influence of specific trypsin inhibitors upon the proteolytic activity of pankrin against urea-denatured hemoglobin substrate was demonstrated as follows:

| Inhibitor | Trypsin | | Chymotrypsin | | Pankrin | |
|---|---|---|---|---|---|---|
| | Activity | Inhibition, percent | Activity | Inhibition, percent | Activity | Inhibition, percent |
| None | 11.94 | -------- | 5.70 | -------- | 35.80 | -------- |
| Soybean Trypsin Inhibitor | 1.58 | 87 | 3.67 | 36 | 28.20 | 21 |
| Pancreatic Trypsin Inhibitor | 2.41 | 80 | 4.63 | 19 | 24.50 | 32 |

The inhibitor concentration in these analyses was 100 gamma per unit of proteolytic activity. This amounts to a weight ratio of inhibitor to enzyme of 4 (pankrin), 1.2 (trypsin) and 0.6 (chymotrypsin).

*Example VIII*

The influence of betaphenyl propionate upon the proteolytic and esterolytic activity of chymotrypsin and pankrin can be demonstrated, as follows:

| Substrate | Betaphenyl propionate conc. (M) | Chymotrypsin Activity (units) | | | Pankrin Activity (units) | | |
|---|---|---|---|---|---|---|---|
| | | Init. | Final | Inhibit., percent | Init. | Final | Inhib., percent |
| urea-denatured hemoglobin | 0.09 | 5.70 | 1.60 | 72 | 35.80 | 16.49 | 54 |
| ATEE | 0.06 | 0.396 | 0.190 | 52 | 0.187 | 0.161 | 14 |
| ATEE | 0.006 | 0.396 | 0.356 | 10 | 0.187 | 0.187 | 0 |

The differences in sensitivity of pankrin and chymotrypsin to inhibition by beta phenyl propionate exceed the limits of error for the assay method. Consequently, these results indicate that the inhibition of chymotrypsin by beta phenyl propionate is qualitatively different from that of pankrin.

While in the foregoing specification, various embodiments of this invention have been set forth and specific details thereof elaborated for the purpose of illustration, it will be apparent to those skilled in the art that this invention is susceptible to other embodiments and that many of these details can be varied widely without departing from the basic spirit and concept of the invention.

We claim:

1. A proteinase, characterized chemically by being insoluble in water and characterized analytically by being incapable of clotting blood plasma, clotting milk, and having a proteolytic activity on urea-denatured hemoglobin and ATEE substrates such that the ratio of its hemoglobin to ATEE activity is at least 150.

2. A proteinase, characterized chemically by being insoluble in water, soluble in a 60% aqueous alcohol solution at a temperature of 25° C. and maintaining proteolytic activity in an aqueous solution of pH 4.7 at a temperature of 25° C. for a period of 8 hours, and characterized analytically by being incapable of clotting blood plasma, clotting milk, and having a proteolytic activity on urea-denatured hemoglobin and ATEE substrates such that the ratio of its hemoglobin to ATEE activity is at least 150.

3. A proteinase, derived from an animal source, being insoluble in water, incapable of clotting blood plasma, clotting milk, and having a proteolytic activity on urea-denatured hemoglobin and ATEE substrates such that the ratio of its hemoglobin to ATEE activity is at least 150.

4. The proteinase of claim 3 in which said animal source is mammalian pancrease.

5. In a method of obtaining a proteinase, the steps of contacting a carboxylic acid cation exchange material and a crude aqueous concentrate of pancrease tissue at a pH of from 4.5 to 5.0 and an ionic strength of not more than 0.4 to adsorb said proteinase thereon, and then contacting said cation exchange material and an aqueous saline solution at a pH of from 4.5 to 5.0 and an ionic strength of at least 0.4 to elute said proteinase therefrom.

6. In a method of obtaining a proteinase, the steps of adsorbing said proteinase, contained in a crude aqueous concentrate of pancreas tissue, on a carboxylic acid cation exchange material at a pH of from 4.5 to 5.0 and an ionic strength of not more than 0.4, and then eluting the adsorbed proteinase from said cation exchange material, at a pH of from 4.5 to 5.0 and an ionic strength of at least 0.4.

7. In a method of preparing a proteinase, the steps of contacting a carboxylic acid cation exchange material and an aqueous extract of pancreas tissue having a pH of about 4.7 and an ionic strength of about 0.05 to absorb said proteinase thereon, and then contacting said cation exchange material and an aqueous saline solution having a pH of about 4.7 and an ionic strength of about 2.0 to elute said proteinase therefrom.

8. In a process for obtaining a proteinase, the step of contacting a crude aqueous concentrate of pancreas tissue with a carboxylic acid cation exchange material at a pH of from 4.5 to 5.0 and an ionic strength of not more than 0.4 to adsorb said proteinase on said cation exchange material.

9. In a method of obtaining a proteinase, the steps of contacting a weak cation exchange material with a crude aqueous concentrate of pancreas tissue at a pH of from 4.5 to 5.0 and an ionic strength of not more than 0.4 to adsorb said proteinase thereon, and then contacting said cation exchange material with an aqueous saline solution at a pH of from 4.5 to 5.0 and an ionic strength of at least 0.4 to elute said proteinase therefrom.

10. In a method of obtaining a proteinase, the step of contacting a crude aqueous concentrate of pancreas tissue with a weak cation exchange material at a pH of from 4.5 to 5.0 and an ionic strength of not more than 0.4 to adsorb said proteinase on the cation exchange material.

11. In a process for obtaining a proteinase, the step of contacting a weak cation exchange material with an aqueous saline solution at a pH of from 4.5 to 5.0 and an ionic strength of at least 0.4, said cation exchange material having adsorbed thereon a proteinase characterized analytically by being incapable of clotting blood plasma, clotting milk, and having a proteolytic activity on urea-denatured hemoglobin and ATEE substrates such that the ratio of its hemoglobin to ATEE activity is at least 150.

12. The process of claim 11 in which said weak cation exchange material is a carboxylic acid cation exchange material.

References Cited in the file of this patent

Kunitz et al.: "J. Gen. Physiol," vol. 19 (1936), pp. 991 to 1007.

"Advances in Enzymology," vol 2 (1942), pp. 55 and 56.

Sumner et al.: Enzymes, Academic Press, N. Y., N. Y., (1943), p. 36.

Northrop et al.: Crystalline Enzymes, Columbia University Press, N. Y., (1948), pp. 96–124.

Chantrenne et al.: Jour. Biol. Chem. 187, December 1950, pp. 758–759.

Tallan et al.: J. A. C. S., 73, June 1951, pp. 2976–2977.

Rohm & Haas Co., Amber-Hi-Lites, No. 20, January 1953, page 2.

Grant et al.: J. A, C. S., 77, 2027 (1955).

Grant et al., J. A. C. S., 78, 5888–5890 (1956).